United States Patent [19]

Krugmann

[11] 4,252,546

[45] Feb. 24, 1981

[54] PROCESS AND APPARATUS FOR THE RECOVERY OF THE SOLVENT FROM THE EXHAUST AIR OF DRY CLEANING MACHINES

[76] Inventor: Hans G. Krugmann, Moosrosenweg 17, D-2000 Hamburg 71, Fed. Rep. of Germany

[21] Appl. No.: 32,461

[22] Filed: Apr. 23, 1979

Related U.S. Application Data

[63] Continuation of Ser. No. 870,227, Jan. 17, 1978, abandoned.

[30] Foreign Application Priority Data

Jan. 19, 1977 [DE] Fed. Rep. of Germany ....... 2701938

[51] Int. Cl.³ ............................................ B01D 59/08
[52] U.S. Cl. ......................................... 55/82; 55/85; 55/95; 55/256; 68/18 C; 68/18 D
[58] Field of Search ................. 55/82, 85, 95, 255, 55/256, 267, 269; 68/18 R, 18 D, 18 C; 8/142

[56] References Cited

U.S. PATENT DOCUMENTS

| 852,543 | 5/1907 | Deckebach | 55/222 |
| 1,977,107 | 10/1934 | Agronofsky | 55/85 |
| 2,656,696 | 10/1953 | McDonald | 68/18 R |
| 3,177,126 | 4/1965 | Chavreau | 68/18 C |

FOREIGN PATENT DOCUMENTS 715833 9/1954 United Kingdom ................. 68/18 C Primary Examiner—Bernard Nozick
Attorney, Agent, or Firm—Toren, McGeady and Stanger

[57] ABSTRACT

A process for recovering the solvent from the exhaust air of dry cleaning machines in which the exhaust air is passed in closed circuit over a cooling device for condensation purposes, wherein the exhaust air is forced through an intensely cooled solvent immersion bath and the water separated in the immersion bath in the form of ice crystals is drained off at an overflow together with the solvent excess formed by condensation and which raises the solvent level.

1 Claim, 1 Drawing Figure

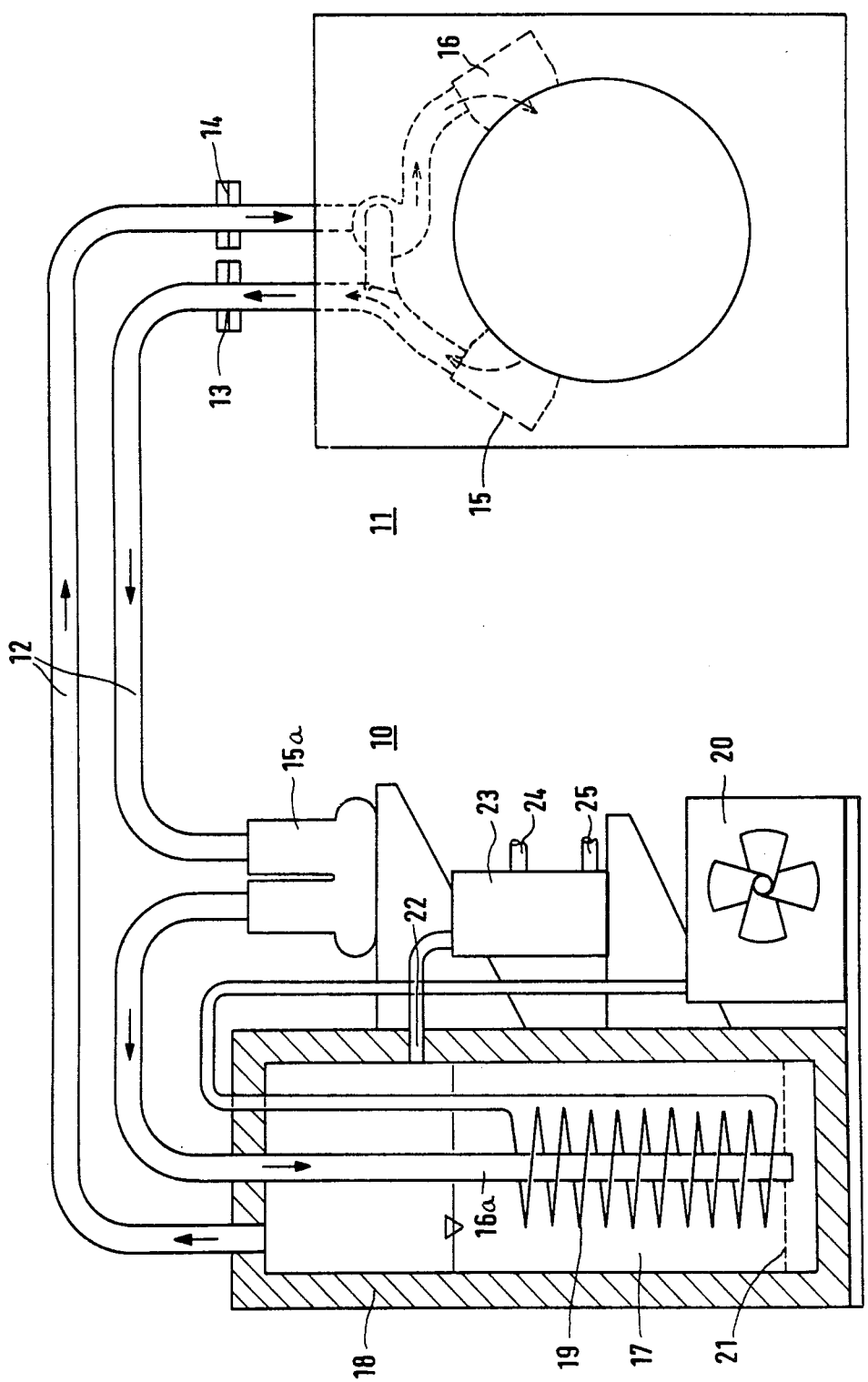

PROCESS AND APPARATUS FOR THE RECOVERY OF THE SOLVENT FROM THE EXHAUST AIR OF DRY CLEANING MACHINES

This is a continuation of application Ser. No. 870,227 filed Jan. 17, 1978 now abandoned.

The invention relates to a process for the recovery of the solvent from the exhaust air of dry cleaning machines in which for condensation purposes the exhaust air is fed in closed circuit over a cooling device.

Due to the existing legal regulations the maximum quantity of solvent used in dry cleaning machines and in particular perchloroethylene (tetrachloroethylene) discharged into the atmosphere in the exhaust air from such machines is 30 ppm.

At present generally activated charcoal filters are used to satisfy this requirement. However, the difficulty occurs in this respect that such filters only have a limited absorptivity. Therefore at regular intervals measures for the regeneration or desorption of such filters are necessary leading to a considerable expenditure in time, energy and cooling water. However, if such measures are not regularly and conscientiously performed it is impossible to ensure that adequately low exhaust air values are maintained.

Furthermore plants for recovering the solvent from the exhaust air of dry cleaning machines are known in which the exhaust air of the machine travels in a closed ring main containing a cooling device for recovering the solvent by condensation. The exhaust air is then passed through sheet metal coolers, below which the condensate containing the solvent and water is collected and separated in accordance with its constituents. However, it has been found that cooling to below 0° C. is not possible because the sheet metal coolers can become blocked through the formation of ice from the water vapour contained in the exhaust air. Thus, the recovery process can only be performed in a temperature range above 0° C., but then so much solvent is contained in the exhaust air that the emission threshold value of 30 ppm cannot be guaranteed. Admittedly the exhaust air from which a considerable proportion of the solvent contained therein has been removed cannot pollute the surrounding area because it is fed back into the dry cleaning machine in the closed circuit of the ring main instead of being discharged into the atmosphere. However, the possibility still exists that the only partly purified exhaust air can enter the working area on opening the machine loading door. As a result the maximum permitted working area concentration value can be exceeded.

The problem of the invention is to provide a process of the type indicated hereinbefore which makes it possible to recover a large proportion of the solvent in the exhaust air from a machine in a very reliable and at the same time economic manner.

This problem is solved in that travelling in closed circuit the exhaust air is forced through an intensely cooled solvent immersion bath and the water which separates in the immersion bath in the form of ice crystals is drained off at an overflow together with the solvent excess formed through condensation and which increases the solvent level.

An immersion bath which utilises the solvent as the coldness exchanger and at the same time as the coldness reservoir is particularly suitable for use as a cooling device in such a process due to the low freezing point of the solvent, particularly perchloroethylene which has a freezing point of −22° C. The exhaust air from the immersion tube which rises in the cooling liquid column in the form of bubbles is particularly thoroughly purified in a relatively small area. The solvent condensate formed immediately combines with the solvent serving as the cooling liquid, whilst the condensed water fraction of the exhaust air immediately floats to the surface of the liquid in the form of ice crystals. The ice crystals which flow out of the insulating container via the overflow together with the solvent excess and at the ambient temperature outside the cooling device rapidly melt to form water which, due to the specific gravity difference of 1:1.6 between water and perchloroethylene can easily and rapidly be separated from the recovered solvent in a separating container. This solvent can immediately be re-used.

According to the invention a solvent recovery apparatus for performing the novel process with a closed ring main connectable to a dry cleaning machine and in which is arranged a cooling device comprises the cooling device being constituted by an intensely cooled solvent immersion bath in a closed insulating container which is partly filled by the same and in which are immersed the cooling coil of a refrigerator located outside the insulating container and the end of that part of the ring main which serves as an exhaust air supply line constructed as an immersion tube, whereby above the solvent level thereof is provided an overflow opening leading into a separating container, whilst a forced flow conveying mechanism is placed in the ring main in series with the cooling device. The forced flow conveying mechanism can be a sufficiently powerful blower, a compressor or a vacuum pump of corresponding dimensions and characteristics. It is particularly advantageous to use a ring duct blower which is able to develop a particularly high pressure and adequate delivery rate per time unit and which is therefore particularly well suited to force the exhaust air through the liquid column formed from the solvent which has a relatively high specific gravity.

The invention is illustrated in exemplified manner hereinafter relaive to the drawing.

The drawing shows a solvent recovery apparatus 10 according to the invention in conjunction with a known dry cleaning machine 11 to which it is connected. By means of a ring main 12, connected to exhaust air cooler 15 or the heater 16 of the machine via pipe flanges 13, 14, the exhaust air leaving the machine is passed in the direction of the arrow through apparatus 10 and from the latter back into machine 11. In addition to ring main 12 apparatus 10 has a ring duct blower 15a located in its feed part. From blower 15a the exhaust air passes via the open end of an immersion tube 16a into the solvent immersion bath 17 which falls to about two thirds of its height a columnar closed insulating container 18. A cooling coil 19 supplied by means of a refrigerator 20 located outside the insulating container 18 is immersed in the immersion bath in helical manner, whilst immersion tube 16 is centrally immersed therein. Just above the opening formed by the end of the immersion tube and through which the exhaust air passes into the immersion bath 17 is provided a distribution sieve 21 via which the exhaust air in the form of numerous tiny bubbles rises up to the liquid surface of the liquid column 17 formed by the solvent which serves both as a coldness exchanger and a coldness reservoir. Due to the cooling the solvent fraction contained in the exhaust air is condensed and immediately combines with the cooling liquid which also comprises the solvent, whilst the water fraction also contained in the exhaust air is condensed in the form of ice crystals, which immediately float to the surface of the liquid due to their lower specific gravity. Due to the addition of the two condensates the liquid level rises. Just above the normal height of the liquid is provided an overflow opening 22 in the wall of insulating container 18 via which the ice crystals together with the excess solvent can flow out into a separating container 23. Outside insulating container 18 the ice crystals immediately melt to water. Due to their different specific gravity the solvent and water are separated in the separating container, so that they can be removed by means of discharge openings 24, 25 arranged at different heights. The purified exhaust air passes from the area above the liquid level in the insulating container via the return part of ring line 12 back into dry cleaning machine 11.

When using perchloroethylene (tetrachloroethylene) the temperature of the solvent immersion bath 17 can be kept constantly at $-20°$ C., i.e. just above the freezing point of this liquid. The qantities of air removed as exhaust air from the dry cleaning machine can be easily regulated by a corresponding control of the forced flow feed mechanism, particularly if a ring duct blower is used. As a result of the cooling device 15 which is normally provided in a dry cleaning machine the exhaust air can be precooled and consequently the operating efficiency of the immersion bath 17 can be increased. As a result of these measures the capacity and power consumption of the novel solvent recovery apparatus can be kept relatively small. The forced flow feed mechanism for the exhaust air is preferably arranged in that part of the ring main which serves as the exhaust air feed to the immersion bath. However, it is fundamentally possible to locate it in that part of the ring main which forms the return line for the purified exhaust air, although this is generally more complicated.

What I claim is:

1. A process for the recovery of solvent from the exhaust gas and air mixture of a dry cleaning machine, said solvent being utilized in said machine and having a freezing point below the freezing point of water, the process comprising the steps of: providing a substantially nonaqueous bath consisting of said solvent in liquid form; maintaining the temperature of said bath between the freezing point of said solvent and the freezing point of water; passing the exhaust gas from said dry-cleaning machine through said liquid solvent bath in direct contact therewith thereby to cause the gaseous solvent to condense within said bath and aqueous moisture in said exhaust gas to immediately freeze within and float upon the surface of said bath; drawing purified air from above said bath and returning it to said dry-cleaning machine; removing the water condensed in the form of floating ice crystals and excess solvent from said bath as overflow; and separating the liquid solvent and the water resulting from the molten ice crystals by decanting said overflow; said solvent bath and said dry-cleaning machine being interconnected in a closed circuit path through which said exhaust gas and purified air are continuously passed therebetween.

* * * * *